United States Patent
Bauer et al.

(10) Patent No.: US 10,487,663 B2
(45) Date of Patent: Nov. 26, 2019

(54) AIRFOIL WITH IMPROVED COOLING

(71) Applicant: ANSALDO ENERGIA SWITZERLAND AG, Baden (CH)

(72) Inventors: Rainer Bauer, Waldshut-Tiengen (DE); Shailendra Naik, Gebenstorf (CH); Marc Henze, Wettingen (CH)

(73) Assignee: ANSALDO ENERGIA SWITZERLAND AG, Baden (CH)

(*) Notice: Subject to any disclaimer, the term of this patent is extended or adjusted under 35 U.S.C. 154(b) by 359 days.

(21) Appl. No.: 14/705,315

(22) Filed: May 6, 2015

(65) Prior Publication Data
US 2015/0322798 A1 Nov. 12, 2015

(30) Foreign Application Priority Data
May 12, 2014 (EP) ..................... 14167966

(51) Int. Cl.
*F01D 5/18* (2006.01)
*F01D 5/14* (2006.01)

(52) U.S. Cl.
CPC ............... *F01D 5/18* (2013.01); *F01D 5/141* (2013.01); *F01D 5/186* (2013.01); *F05D 2220/32* (2013.01); *F05D 2240/127* (2013.01); *F05D 2250/185* (2013.01); *F05D 2250/71* (2013.01); *F05D 2260/20* (2013.01); *Y02T 50/673* (2013.01); *Y02T 50/676* (2013.01)

(58) Field of Classification Search
CPC . F01D 5/18; F01D 5/141; F01D 5/186; F05D 2220/32; F05D 2240/127; F05D 2250/185; F05D 2250/71; F05D 2260/20; F05D 2260/2212; F05D 2260/22141

USPC ........................................................ 416/97 R
See application file for complete search history.

(56) References Cited

U.S. PATENT DOCUMENTS

| | | | | |
|---|---|---|---|---|
| 4,627,480 A | * | 12/1986 | Lee ........................... | B22C 9/04 164/122.1 |
| 5,488,825 A | * | 2/1996 | Davis ...................... | F01D 5/187 415/115 |
| 6,132,173 A | * | 10/2000 | Tomita .................... | F01D 5/187 415/114 |
| 2001/0018024 A1 | * | 8/2001 | Hyde ...................... | F01D 5/187 416/96 R |

(Continued)

FOREIGN PATENT DOCUMENTS

WO 2009/118245 A1 10/2009

OTHER PUBLICATIONS

Examination Report dated Mar. 27, 2018 by the Patent Office of the Cooperation Council for the Arab States of the Gulf in corresponding Application No. GC 2015-29378.

*Primary Examiner* — Aaron R Eastman
(74) *Attorney, Agent, or Firm* — Buchanan Ingersoll & Rooney PC (57) ABSTRACT

The present invention relates to an airfoil for a gas turbine, including an improved turbulator arrangement formed on an inner cooling channel of the airfoil. According to preferred embodiments of the invention, in order to ensure a constant angle of the cooling flow inside the channel relative to each turbulator, the angle formed between the turbulator and the vertical axis is advantageously adapted, in the curved area, for every single turbulator. Furthermore, the same principle may be applied to all the cooling channels present within the airfoil.

14 Claims, 6 Drawing Sheets

(56) References Cited

U.S. PATENT DOCUMENTS

| | | | | |
|---|---|---|---|---|
| 2004/0219017 | A1* | 11/2004 | Liang | F01D 5/187 416/97 R |
| 2005/0175454 | A1* | 8/2005 | Dube | F01D 5/187 416/97 R |
| 2008/0028606 | A1* | 2/2008 | Krishnakumar | B22C 9/043 29/889.2 |
| 2008/0181784 | A1* | 7/2008 | Fokine | F01D 5/187 416/97 R |
| 2011/0103932 | A1* | 5/2011 | Dueckershoff | F01D 5/187 415/115 |
| 2011/0243755 | A1* | 10/2011 | Naik | F01D 5/187 416/97 R |
| 2015/0204197 | A1* | 7/2015 | Lee | F01D 5/187 416/97 R |

* cited by examiner

PRIOR ART

AIRFOIL WITH IMPROVED COOLING

CROSS-REFERENCE TO RELATED APPLICATIONS

This application claims priority to European application 14167966.2 filed May 12, 2014, the contents of which are hereby incorporated in its entirety.

TECHNICAL FIELD

The present invention relates to an airfoil for a gas turbine, comprising an improved turbulators arrangement formed in an inner cooling channel of the airfoil.

BACKGROUND

As well known, gas turbines or in general machineries configured to extract useful work by means of elaborating the flow of hot gases, include components, such as airfoils, deployed to such function. Airfoils, during operation of the machinery, need to be cooled in order to maintain the temperature of their parts within acceptable limits. For this reason, airfoils generally comprise longitudinally extending inner channels, or ducts, which are configured to receive cooling air. Usually, the airfoil comprises a plurality of inner channels connected to each other in a serpentine-type configuration. In particular, the cooling air enters in the cooling circuit in a first channel which is located in the proximity of the leading edge, which is the portion of the airfoil with high external heat load, and exits the circuit through a cooling channel which is in turn located in the proximity of the trailing edge.

Inside the channels, turbulence promoters or turbulators are means commonly deployed in order to generate turbulence near the inner walls of the cooling channels, thus enhancing the thermal exchange between the cooling flow and the airfoil and therefore improving the cooling performance.

Turbulators are generally provided in the form of rib-shaped elements disposed on the inner walls of the cooling channels.

One of the parameter which affects the heat exchange between the airfoil and the cooling fluid is the angle formed between the direction of the cooling air flow, which follows the longitudinal axis of the airfoil, and the turbulator. For airfoils having a straight longitudinal axis, the ribs maintain a constant inclination along the vertical axis and such angle is constant throughout the cooling channel.

However, in order to improve the turbine efficiency, the airfoil may be three-dimensional shaped meaning that its longitudinal axis may be curved and deviating from the vertical axis, which is the component design axis and it is generally referred to the placement of the gas turbine. Such curvature is usually mostly pronounced in the proximity of the leading edge portion of the airfoil.

As a consequence, arranging the ribs along the inner wall of the cooling channel with a fixed inclination in respect to a vertical axis results in a poor cooling performance, since the areas where the longitudinal axis is curved are characterised by a reduction of the angles formed by the ribs and the direction of the cooling air flow. As indicated above, such angle is a driving parameter for the efficiency of the cooling system.

In addition, still according to known airfoils, the distance between subsequent ribs, or rib-to-rib pitch, which is another driving parameter for the heat transfer, is kept constant along the vertical axis. Similarly, such known geometry leads, for airfoils having 3D curved shape, to a change in the rib-to-rib pitch, commonly known as P. In particular, this leads to even higher pitches and, as for the effective rib angle, further decreases the heat transfer in those affected regions.

Therefore, the standard design approach provides inadequate cooling particularly for airfoils having curved profile. Furthermore, the standard approach leads to inhomogeneous cooling along a curved duct, since in the area with the most curved shape the heat transfer is lower compared to the straight portion.

A possible counter measurement for a standard design would be to increase the cooling air consumption. However, the geometry of the turbulators deployed inside the cooling ducts would remain the same and therefore this would result in less cooling performance in the 3D shapes area compared to the straight portion and the inhomogeneous cooling along the duct will still be present. In addition, increasing the cooling air flow, such to maintain the metal temperatures in the curved portions of the airfoils within predetermined valued, would inevitably reduce turbine efficiency and power.

SUMMARY

The object of the present invention is to solve the aforementioned technical problems by providing an innovative airfoil as substantially defined in independent claim 1.

Preferred embodiments are defined in correspondent dependent claims.

According to preferred embodiments of the invention, which will be described in the following detailed description only for exemplary and non-limiting purposes, in order to ensure a constant angle of the cooling flow inside the channel relative to each turbulator, the angle formed between the turbulator and the vertical axis is advantageously adapted, in the curved area, for every single turbulator. Furthermore, the same principle may be applied to all the cooling channels present within the airfoil.

Moreover, according to preferred embodiments of the invention, the maximum variation of relative inclination between two subsequent turbulators should not exceed 3°, because otherwise a higher variation between the pitch at the leading edge and trailing edge of the rib would result in lower cooling performance.

Lastly, the distance or pitch, between subsequent turbulators, is adapted such to maintain the pitch constant along the cooling flow path whilst varying along the vertical axis.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings, wherein.

DETAILED DESCRIPTION

Figure 1:
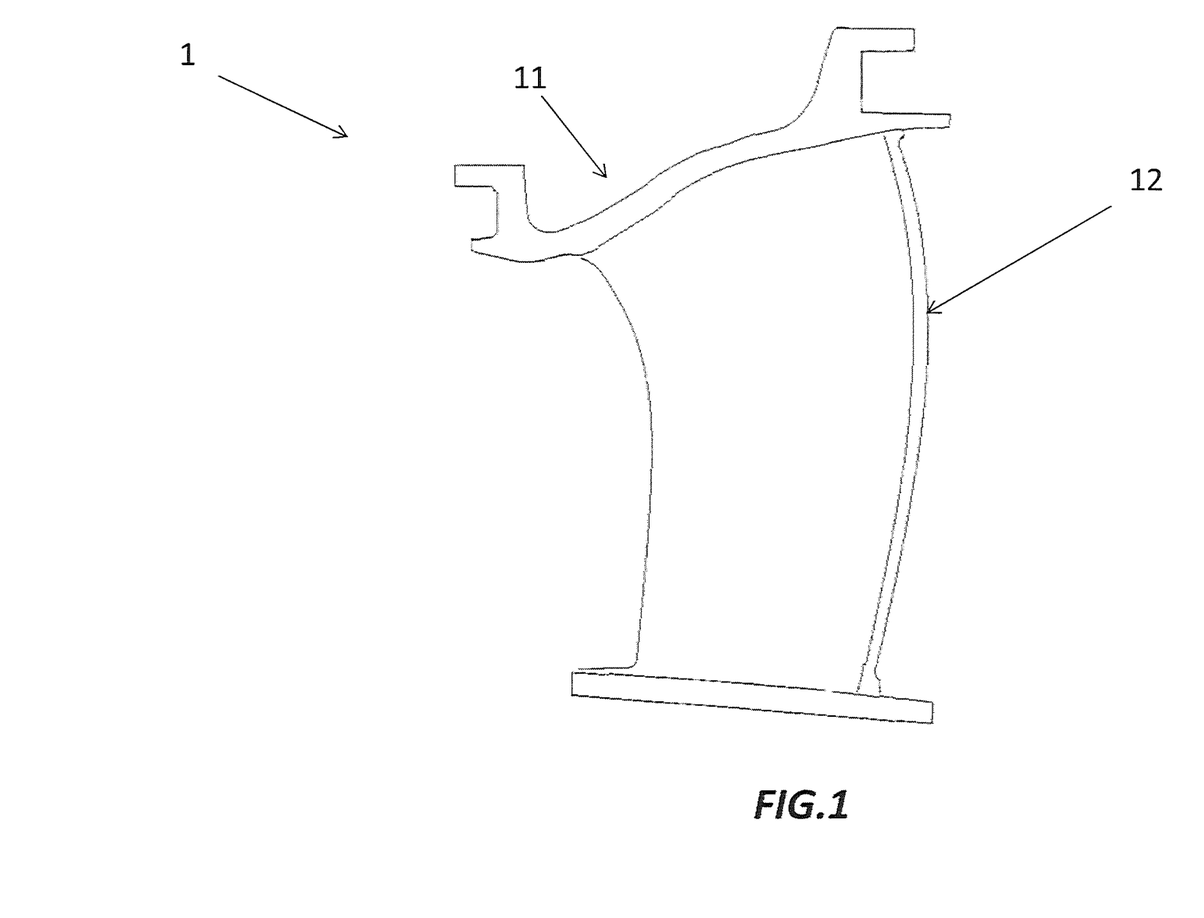
FIG. 1 is a perspective view of an airfoil for a gas turbine according to the invention.

With reference to FIG. 1, it is showed an external view of an airfoil according to the present invention for a gas turbine, generally denoted with the numeral reference 1. The airfoil 1 comprises an internal cooling circuit (not visible in FIG. 1) having an inlet 11 for blowing inside its structure a cooling fluid, which is usually air bled from the engine's compressor, and a pressure side bleed 12 as an outlet at the end of the cooling circuit.

Figure 2:
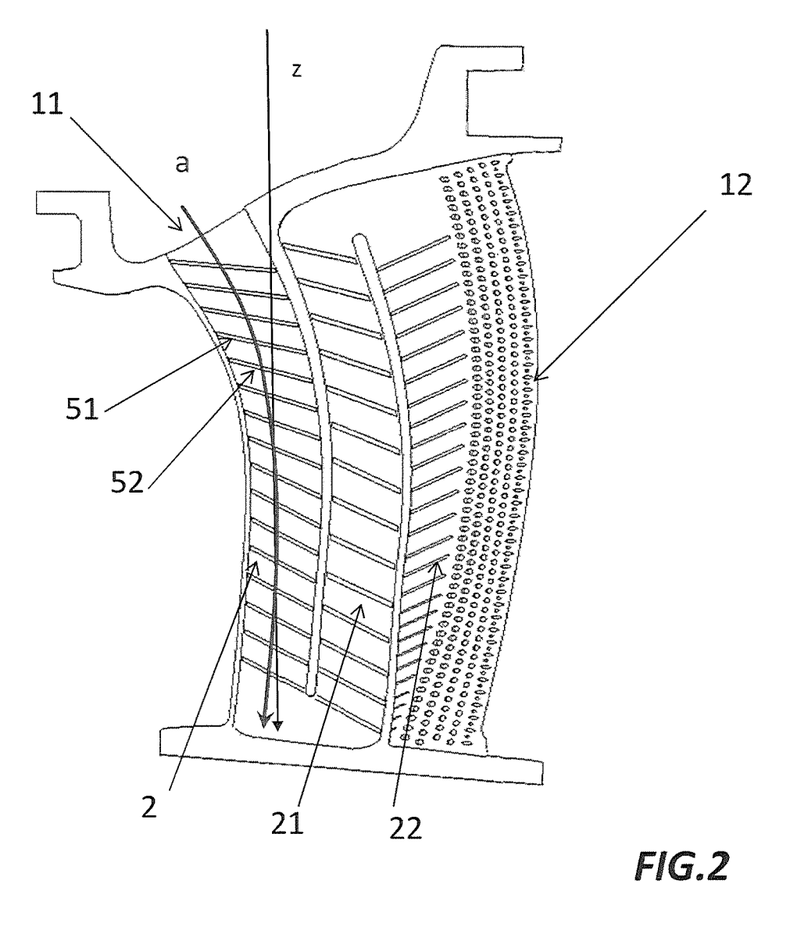
FIG. 2 is a section view of the airfoil of FIG. 1.

With reference to next FIG. 2, it is shown a cross section of the airfoil 1. In particular, the cross section of FIG. 2 reveals the presence of inner cooling channels 2, 21, and 22 which are connected to each other in a serpentine-type configuration. Inner channel 2 is located in the proximity of the leading edge portion of the airfoil, while inner channel 22 is located in proximity of the trailing edge of the airfoil 1. Inner channel 21 is a middle channel positioned between channel 2 and channel 22. It will be appreciated that the airfoil may also comprise different kind of cooling circuits, which may comprise even only one cooling channel.

From now on reference will be made to leading edge inner channel 2, but it will be appreciated that same description will apply to every channel of the cooling circuit. As visible in the figure, cooling channel 2 defines a longitudinal axis a and comprises a first lower portion (which can be attached to a rotor body of the gas turbine, not depicted) and an upper portion. In particular, the lower portion is substantially straight and the longitudinal axis a along said portion is substantially aligned with a vertical axis z, generally associated to a vertical direction associated to a design axis of the gas turbine. Differently, the upper portion is twisted in its three-dimensional development and the longitudinal axis a in said portion significantly deviates from the vertical axis z, as clearly visible in the figure. In order to generate turbulence within the cooling channel and promote the heat exchange between the cooling flow and the airfoil, a plurality of longitudinally spaced turbulators are provided along the channel. As a non-limiting example, reference will be made to subsequent turbulators 51 and 52, as indicated in the figure. In this preferred embodiment, turbulators are provided in the form of rib-shaped elements. However, other shapes may be considered.

Figure 3:
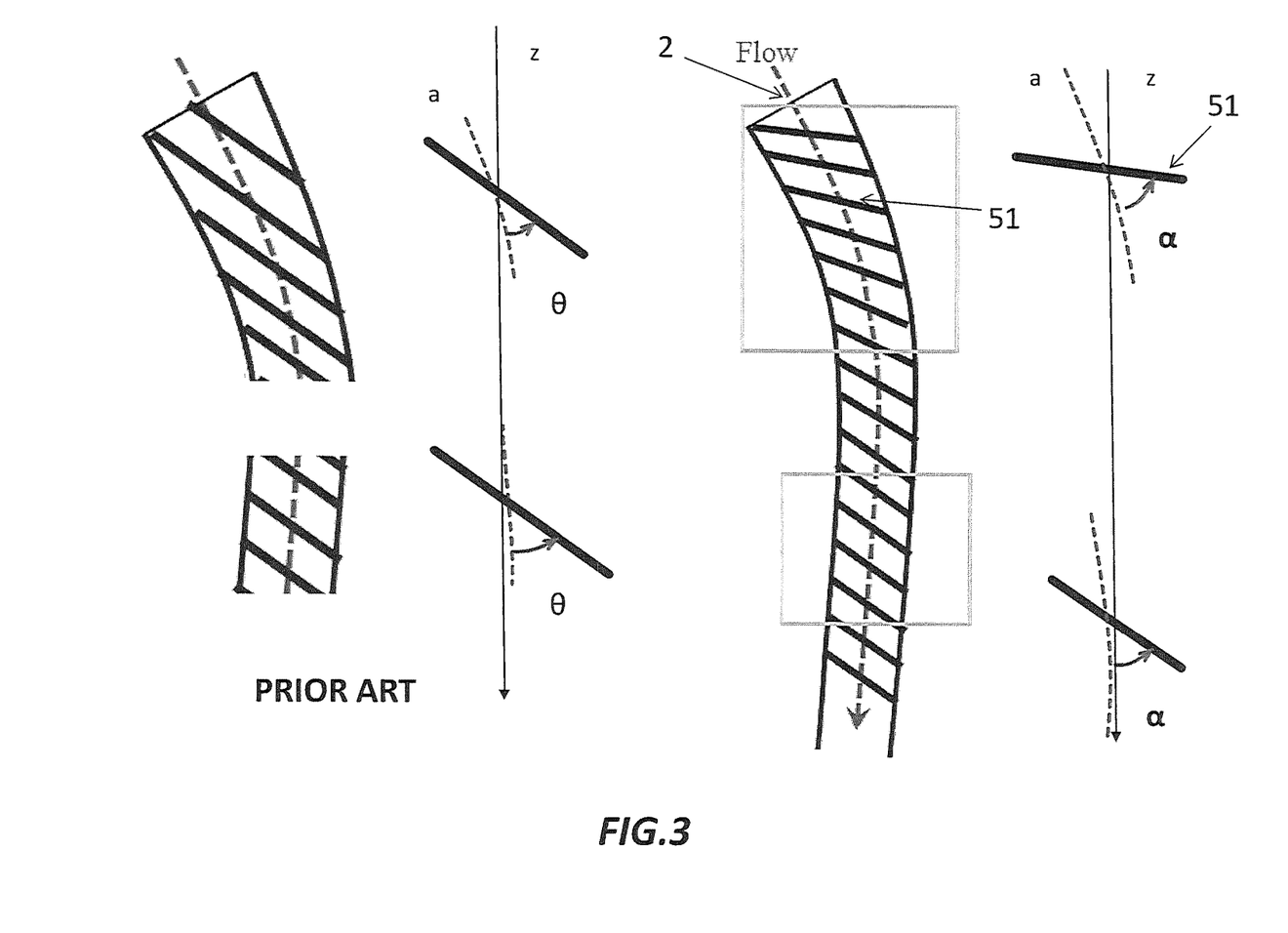
FIGS. 3 and 4 schematically show a section view of an airfoil having a turbulator arrangement according to the present invention (on the right) versus an arrangement according to the prior art (on the left)

With reference now to the following FIG. 3 left side, it is schematically shown a typical arrangement of rib-shaped elements, or ribs, along a cooling channel according to the prior art. In particular, the ribs are disposed with a constant inclination in respect to the vertical axis z. However, the upper portion of the channel is twisted and therefore the longitudinal axis a deviates from it. Since the cooling flow bled inside the channel follows the direction defined by the longitudinal axis a of the duct, such arrangement leads to having smaller tilt angles θ between the flow and the ribs within the upper bent portion of the channel, and bigger tilt angles A in the lower portion. Such tilt angle variation along the channel results in an inhomogeneous cooling performance along the duct. With reference to FIG. 3 right-side, it is shown a rib arrangement along the cooling channel 2 according to the present invention. In particular, the inclination of each rib with respect to the vertical axis z is now adapted such that a tilt angle α formed between the rib and the longitudinal axis a (which is aligned with the direction of the cooling flow) is substantially constant along the inner cooling channel 2. More preferably, angle α may vary along the duct within a range of +/−3° around a mean value. It has been evaluated that satisfying cooling performances can be achieved when the tilt angle α is selected within a range of 40°-70°, intended as a mean value if the angle varies within the above-mentioned range. More preferably, the angle is selected between a range 45°-60°. In a preferred embodiment, tilt angle α is substantially 60°.

Figure 4:
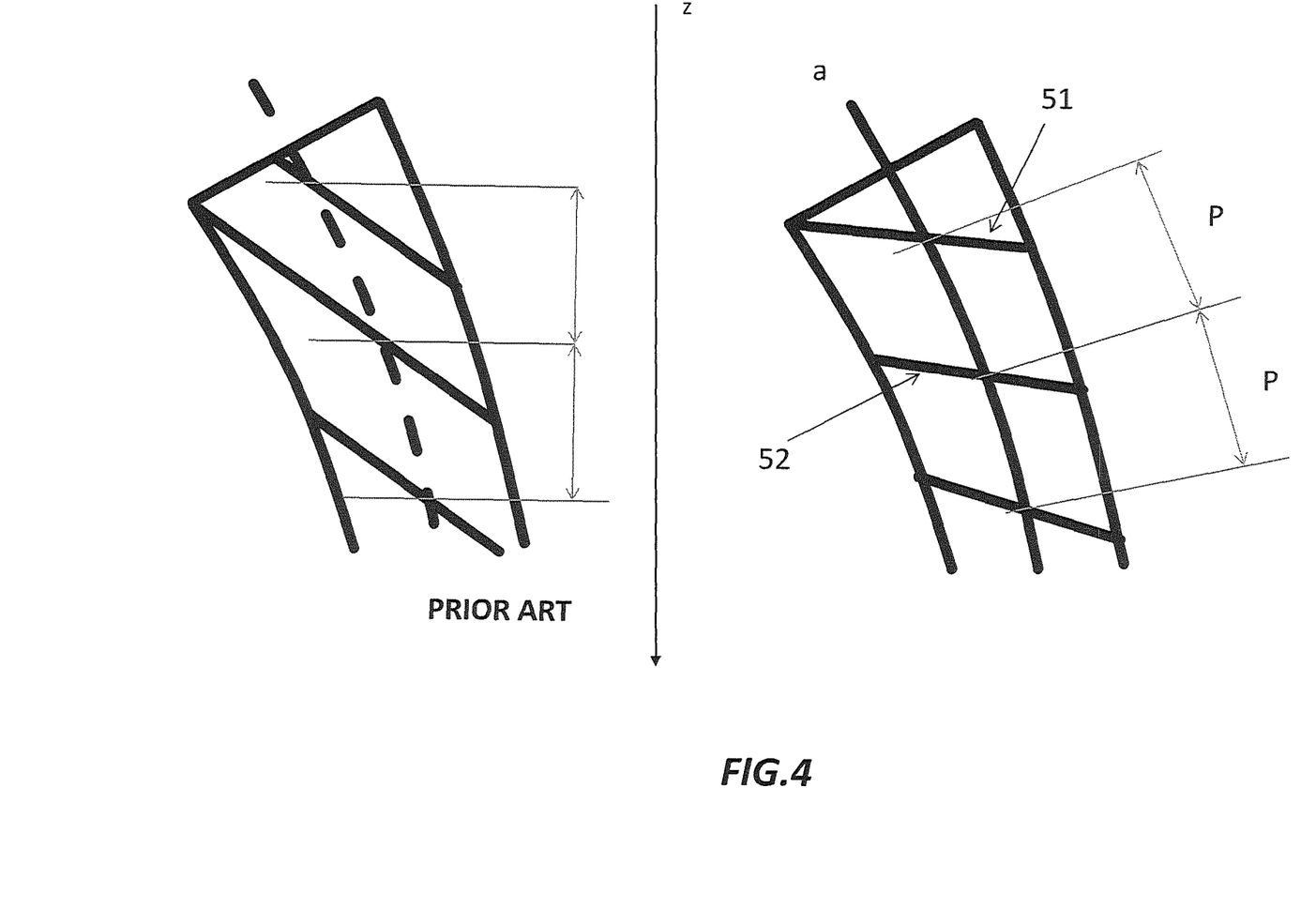

Making now reference to following FIG. 4, a further preferred embodiment of the present invention is schematically shown. On the left side is again depicted a rib arrangement according to the prior art. In particular, it may be appreciated that the ribs are arranged along the channel such that the distance, or pitch, between subsequent ribs is constant along the vertical axis z. On the right side it is shown a rib arrangement according to the present invention. According to the invention, advantageously, ribs are now equally spaced between each other in the direction of the longitudinal axis a, such that the pitch determined on the longitudinal axis a between subsequent ribs, indicated in the figure with the reference P, is constant along the cooling channel.

Figure 5:
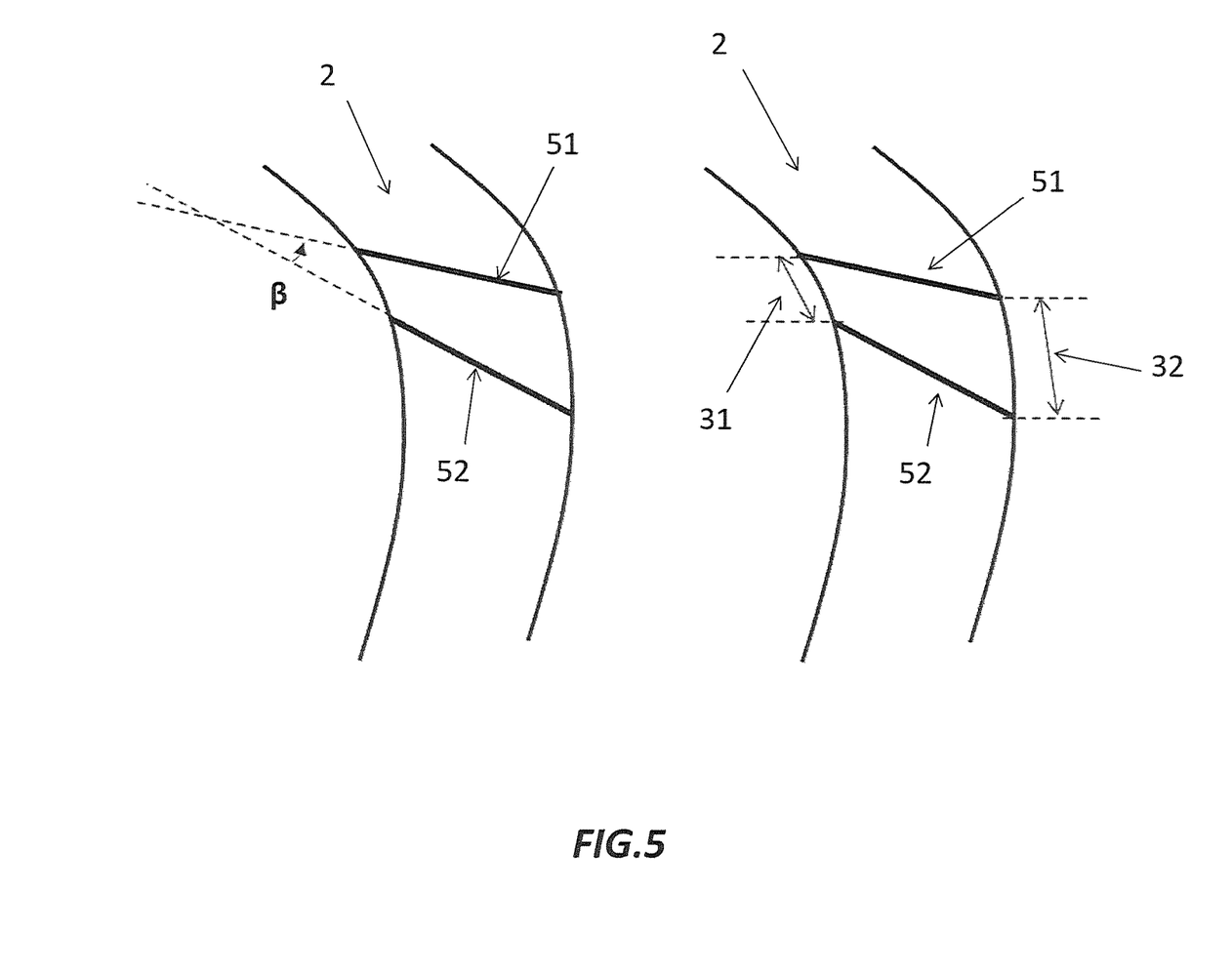
FIG. 5 schematically highlights a preferred embodiment of the airfoil comprising a turbulator arrangement according to the present invention.

With now reference to FIG. 5, preferably, the disposition of two subsequent ribs (in the example of the figure only ribs 51 and 52 are drawn) it is such not to have a large difference between a leading edge pitch, indicated in the figure with numerical reference 31, and a trailing edge pitch, in turn indicated with numerical reference 32. This is achieved maintaining the value of a second tilt angle β, which measures the variation of relative inclination between the two subsequent turbulators 51 and 52, substantially equal or smaller than 3°. With this further preferred constraint, an optimum geometry of ribs arrangement can be achieved resulting in a best cooling performance of the airfoil during operation of the gas turbine.

Figure 6:
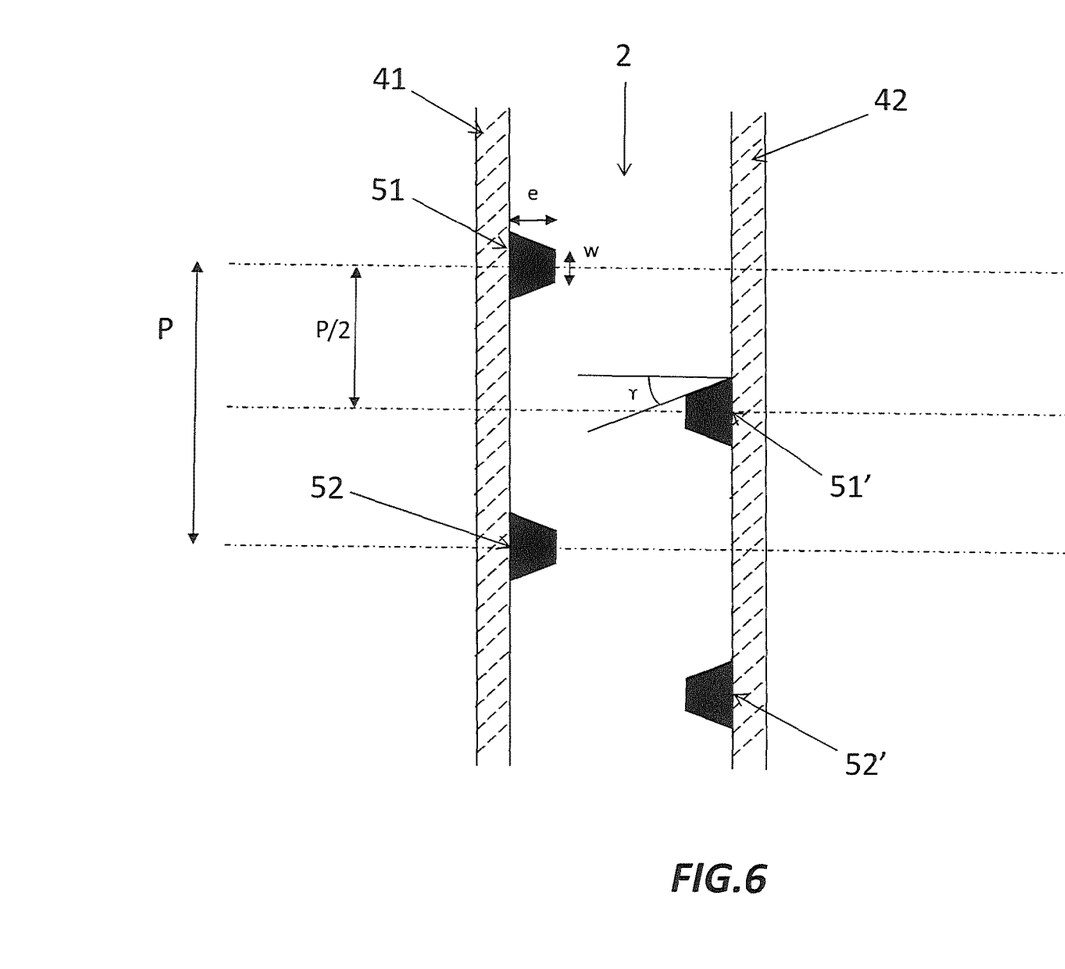
FIG. 6 shows a lateral section view of the airfoil according to the present invention.

With now reference to the last FIG. 6, it is schematically shown a lateral section view of the cooling channel 2 of the airfoil according to the present invention. Cooling channel 2 is defined by a pressure side wall 41 and a suction side wall 42 opposed thereto. On the pressure side wall 41 ribs 51 and 52, depicted as a way of example, are distanced by the pitch P as indicated in preceding FIG. 4. Similarly, facing wall 42 comprises in turn a sequence of ribs. In the figure ribs 51' and 52' are shown. In the preferred embodiment shown here as a non-limiting example, ribs distributed on the pressure side wall 41 are staggered relative to the ribs distributed on the opposed suction side wall 42. Preferably, the distance between subsequent opposed ribs, for example 51 and 51', is chosen equal to P/2, which is half of the pitch.

Still with reference to FIG. 6, the geometry of the ribs is further defined by parameters e and w, which are respectively the height and the width of the rib. In particular, a first parameter is defined as the ratio between the pitch and the height of the rib. The first parameter P/e is selected within the range 5-12. Preferably, the selected value of the first parameter P/e is 8.

Moreover, a second parameter is defined as the ratio between the width and the height of the rib. The second parameter w/e is selected between the range 0.8-1.2. Preferably, the selected value of the second parameter w/e is 1.0.

Lastly, the ribs preferably have, in lateral section, a trapezoidal shape, and define a draft angle γ which, according to preferred embodiments, is selected within the range of 2°-5° (in the figure the angle is increased in size only for clarity purposes).

Although the present invention has been fully described in connection with preferred embodiments, it is evident that modifications may be introduced within the scope thereof, not considering the application to be limited by these embodiments, but by the content of the following claims.

The invention claimed is:

1. An airfoil for a gas turbine, the airfoil comprising:
   at least one inner cooling channel arranged along a longitudinal axis, the at least one cooling channel having a bent portion where the longitudinal axis is curved and deviates from a vertical axis of a design axis of the gas turbine, and
   a plurality of longitudinally spaced turbulators distributed on at least a wall of said inner cooling channel and inclined such that each turbulator forms a tilt angle with the longitudinal axis,
   wherein the inclination of each turbulator is adapted such that the tilt angle is constant along the curved longitudinal axis.

2. The airfoil according to claim 1, wherein said tilt angle varies along the longitudinal axis within a range of +/−3° around a mean value.

3. The airfoil according to claim 1, wherein said tilt angle is selected within a range 40°-70°.

4. The airfoil according to claim 1, wherein said tilt angle is equal to 60° with a range of +/−3°.

5. The airfoil according to claim 1, wherein said turbulators are equally spaced between each other in the direction of the longitudinal axis of the inner cooling channel, such that a pitch determined on the longitudinal axis between subsequent turbulators is constant along the inner cooling channel.

6. The airfoil according to claim 1, wherein a second tilt angle associated to a variation of relative inclination between two subsequent turbulators is equal or smaller than 3°.

7. The airfoil according to claim 1, wherein the airfoil comprises a plurality of inner cooling channels.

8. The airfoil according to claim 7, wherein said plurality of inner cooling channels are connected to each other in series in a serpentine-type configuration.

9. The airfoil according to claim 1, wherein said turbulators are ribs.

10. The airfoil according to claim 1, wherein said cooling channel is defined by first and second opposed walls, the airfoil comprising:
    turbulators distributed on each wall, wherein the turbulators distributed on the first wall are staggered relative to the turbulators distributed on the opposed second wall.

11. A rotor of a gas turbine, the rotor comprising an airfoil according to claim 1.

12. The airfoil according to claim 1, wherein a ratio between a pitch of the turbulators and a height of each turbulator is within a range of 5-12.

13. The airfoil according to claim 12, wherein a ratio of a width of each turbulator and the height of each turbulator is within a range of 0.8-1.2.

14. The airfoil according to claim 13, wherein each turbulator is trapezoidal in lateral cross-section and has a draft angle γ within a range of 2°-5°.

* * * * *